Patented Dec. 6, 1938

2,138,917

UNITED STATES PATENT OFFICE 2,138,917

PRODUCTION OF HIGH MOLECULAR GLYCOLS AND ESTERS THEREOF

Adolf Grün, Basel, Switzerland, assignor to American Hyalsol Corporation, Wilmington, Del., a corporation of Delaware No Drawing. Application October 19, 1935, Serial No. 45,782. In Germany October 27, 1934

9 Claims. (Cl. 260—106)

This invention relates primarily to glycols-1,2 of higher molecular weight and also to acyl derivatives of such glycols.

In the commercial arts, prior inventors have suggested soluble salts of sulfuric acid esters of monovalent higher molecular alcohols for use as wetting, cleaning, dispersing and foaming agents. Likewise, there has been suggested for such uses sulfuric acid esters of high molecular glycols having hydroxyl groups positioned upon carbon atoms some distance apart in the molecule, and also hydroxy sulfonic acids of such glycols in which the sulfo group and the hydroxyl group are joined to carbon atoms some distance apart in the molecule. Although these sulfuric acid derivatives of monovalent alcohols are quite satisfactory for many purposes, the present invention has for one of its objects to make possible and to produce compositions possessing even greater capillary active qualities, better solubility and superior washing power.

Another object of the invention is to produce glycols of high molecular weight which in themselves are of considerable technical value because of their high emulsification power.

Basically considered, the present invention involves the production of glycols-1,2 having at least 8 carbon atoms by oxidizing corresponding olefines-1 of the same number of carbon atoms while dissolved in glacial acetic acid or other aliphatic acid of low molecular weight through the use of a suitable oxygen-liberating compound such as hydrogen peroxide. By properly controlling this process, glycols-1,2 of high molecular weight are obtained in an almost quantitative yield.

Example

Two hundred and twenty-four grams of hexadecene-1 are dissolved in 100 grams of glacial acetic acid with the aid of heat and then while the same is maintained at a temperature of about 95° C. there are slowly added 170 cc. of a 30% solution of hydrogen peroxide. Within about an hour the solution becomes entirely clear. After an additional heating of about an hour at the said temperature, the mass is cooled and poured into water whereby an oil layer and an aqueous layer are formed. The oil layer is decanted off and is then taken up in ether after which the ether solution is neutralized with soda lye.

The acid aqueous solution likewise is neutralized and is also extracted with ether. After combining the two solutions, the ether is evaporated off leaving a product composed of the monoacetyl derivative of hexadecandiol-1,2. This product may then be converted into the free glycol-1,2 by saponifying it, for example by the use of an alcoholic solution of potassium hydroxide. After saponification in this manner, the alcohol is almost completely removed as by heating after which the residue is acidified and extracted with ether to separate the glycol. To obtain the glycol in purer form, the extracted mass is then washed and dried, and the remaining ether evaporated off. In this manner substantially pure hexadecandiol-1,2 in a yield of 94% of the theoretically possible amount is obtained, which product possesses high emulsification powers and furthermore is excellently suited for the production of sulfonation products for use in the industrial arts.

In the foregoing process wherein the acid aqueous solution is extracted with ether a soap-like gelatinous mass forms between the ether layer and the water layer. This intermediate mass can be isolated by filtration assisted by suction. After treating or decomposing the mass with the aid of an acid and extracting with ether, washing and drying the ether solution and evaporating off the ether, a very small quantity of a monobasic higher molecular weight acid, apparently pentadecylic acid, is obtained, which acid is formed during the foregoing process due to oxidation of part of the glycol formed.

Other glycols-1,2 having 8 or more carbon atoms may be produced in a manner similar to that described in the example by treating other straight chain hydrocarbons of 8 to 18 or more carbon atoms having a terminal double bond such as, for example, undecene-1, dodecene-1, octadecene-1, and other similar compounds.

It should be understood that the present invention is not limited to the specific compounds nor the specific conditions hereinbefore disclosed, but that it extends to all equivalent substances and conditions within the scope of the general tenor of the specification and of the appended claims.

For example, other acids than acetic acid may be employed, those having from 3 to 5 carbon atoms may be used with varying degrees of success. Furthermore, instead of hydrogen peroxide, other peroxides may be employed, for example sodium peroxide and also persalts capable of liberating oxygen at a sufficiently rapid rate, provided that there is a sufficient excess of low aliphatic acid over the quantity consumed by the alkali of the said peroxides and persalts although such latter substances are not preferred. The temperature to which the olefine is heated during the oxidation reaction need not be exactly at 95° C. but may be considerably varied to suit the particular olefine treated. In an open vessel under atmospheric pressure a temperature somewhat below boiling is preferred, but the process may also be carried out under pressure and somewhat higher temperatures employed provided the other conditions are varied to compensate therefor.

The invention is not limited to the particular method disclosed for purification of the glycol or its derivative, for other methods and other solvents are apparent to those skilled in the art.

As a result of the oxidation action herein described, glycols-1,2 of higher molecular weight are produced which may be easily converted into their sulfuric acid esters or sulfonic acids by conventional sulfonation procedures. The resulting products when neutralized to form their water soluble salts possess an unusually high solubility and a strong capillary active quality. They may be referred to collectively as the water soluble salts of the sulfuric derivatives of the higher molecular glycols-1,2. Their washing power is superior to that of the sulfuric acid esters of glycols wherein the hydroxyl groups are joined to carbon atoms which are some distance apart in the molecule.

The proportion of glacial acetic acid and hydrogen peroxide with reference to the olefine treated may be varied within wide limits. An excess over the theoretical combining portion of the acid is preferred. The proportion of peroxide employed may be varied in accordance with the particular olefine treated and with the other conditions used. Although acids of an anhydrous nature are preferred, such are not absolutely necessary for the successful operation of the process.

I claim:

1. The method which comprises oxidizing a higher molecular olefine-1 having 8 or more carbon atoms in the molecule into a higher molecular glycol-1,2 while the former is in solution in a low aliphatic acid with the aid of heat for a period necessary to complete the glycol formation, and saponifying to produce free glycol.

2. In producing derivatives of higher molecular glycols-1,2, the steps which comprise heating olefines-1 containing at least 8 carbon atoms while in admixture with a low aliphatic acid and an oxygen delivering per-compound until the olefines-1 are converted into acylated glycols-1,2.

3. In producing acylated higher molecular glycols-1,2, the combination of steps which comprise dissolving an olefine-1 containing at least 8 carbon atoms in a low aliphatic acid and during heating adding an oxygen delivering compound selected from the group consisting of peroxides and persalts.

4. The method of producing higher molecular glycols-1,2 which comprises heating an olefine-1 containing at least 8 carbon atoms while dissolved in a low aliphatic acid, with hydrogen peroxide thereby forming a monoacyl derivative of a glycol-1,2 of high molecular weight, and saponifying to produce the free glycol.

5. In the production of acylated glycols-1,2 of higher molecular weight, the combination of steps which comprises dissolving a straight chain hydrocarbon of at least 8 carbon atoms having a terminal double bond in a low aliphatic acid, oxidizing the hydrocarbon into a glycol-1,2 by reacting said hydrocarbon with hydrogen peroxide under the influence of heat.

6. The method of preparing glycols-1,2 having at least 8 carbon atoms which comprises heating an olefine-1 of higher molecular weight to a temperature of about 95° C. in admixture with a low aliphatic acid and hydrogen peroxide until the olefine-1 is converted into a monoacyl derivative of the corresponding glycol-1,2, and saponifying to produce the free glycol.

7. The method of producing hexadecandiol-1,2 comprising heating hexadecene-1, glacial acetic acid, and hydrogen peroxide at a temperature of about 95° C. until the same is converted to the monoacetyl derivative of hexadecandiol-1,2, and saponifying to produce free hexadecandiol.

8. The method of preparing hexadecandiol-1,2 comprising heating hexadecene-1 and glacial acetic acid in excess to about 95° C. and while said heating is maintained, slowly adding aqueous hydrogen peroxide solution, continuing the heating until the formation of the monoacetyl derivative of hexadecandiol-1,2 is complete, neutralizing such derivative, separating impurities and saponifying thereby producing free hexadecandiol-1,2.

9. The method of producing glycols-1,2 acyl derivatives which comprises reacting and oxidizing an olefine-1 having at least 8 carbon atoms with a low aliphatic acid and a peroxide at an elevated temperature until the formation of a monoacyl derivative of the glycol-1,2 is complete.

ADOLF GRÜN.